R. C. Pratt.

Excavator.

N° 9,860. Patented Jul. 19, 1853.

UNITED STATES PATENT OFFICE.

RALPH C. PRATT, OF CANANDAIGUA, NEW YORK.

MACHINE FOR DITCHING.

Specification of Letters Patent No. 9,860, dated July 19, 1853.

*To all whom it may concern:*

Be it known that I, RALPH C. PRATT, of the town of Canandaigua, in the county of Ontario and State of New York, have invented a new and useful Improvement on a Machine for Excavating or Ditching, which I call a "Ditcher;" and I do hereby declare that the following is a full and clear description of the construction and operation of the same, reference being had to the annexed drawings, making a part of this specification.

Figure 2:
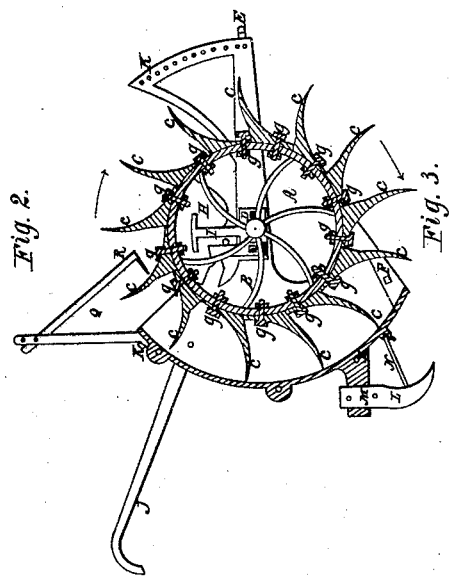
Figure 3:
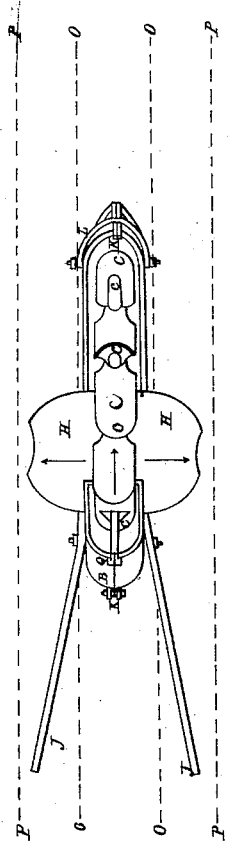
Figure 4:
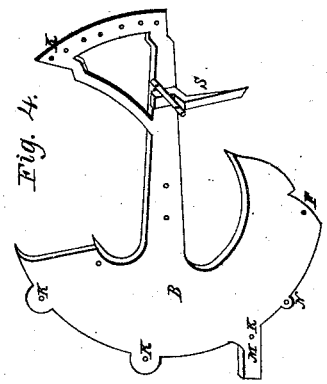
Figure 1:
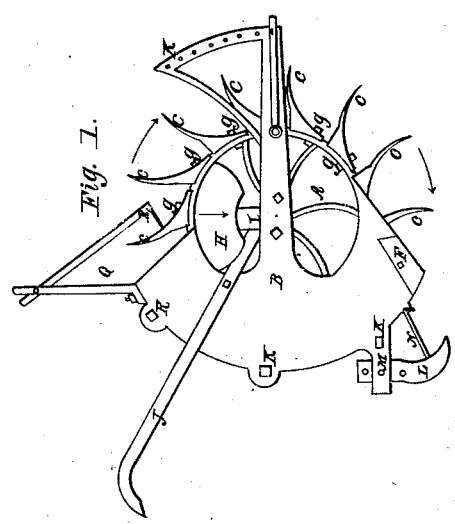

Figure 1 is a side view, Fig. 2 is a longitudinal section, Fig. 3 is an isometrical view, Fig. 4 is a perspective section of one half of the beam and casing.

The different letters represent the different parts, but the same letters represent like parts.

Letter A, is a rotary wheel of any size depending upon the desired depth of the ditch or cutting hung by a shaft.

B is a beam and casing made in two like parts, as shown in Figs. 2 and 4, and hangs upon the shaft of the wheel as shown in Figs. 1, 2 and 3.

c is the shovels attached to the circumference of the wheel, projecting on each side. The width depending upon desired width of the bottom of the ditch. These shovels are sharp and circular on the points so as to be forced easily into the ground by the weight of the digger, the wheel receiving the whole weight of the same. These shovels form so many buckets in connection with the casing which incloses the shovels on every side and in general describes one third to one half of the circumference of the shovels.

D is the bearing of the shaft of the wheel secured to the beam by bolts or otherwise as seen in Fig. 2.

E is the clevis to which the whiffletrees are attached.

F is the cutting and scraping point on the lower end of the casing which is forced into the ground as deep as the shovels are driven, and to which the shovels in the revolutions fit closely to avoid obstruction by stones, &c., and from which they carry up the earth through the casing.

G is the bolts by which the wings are usually secured to the wheel.

H is the inclined slides made usually of sheet iron to discharge the earth as seen in Fig. 3 to either bank of the ditch as it leaves the upper end of the casing.

I as is seen in Fig. 2 secures and supports the inclined slides by the beam.

J is the handles secured as seen in Figs. 2 and 3.

K is the points where the two parts of the beam and casing are fastened together.

L is a miner or cutting plow used to loosen and break up the ground for the next passage of the ditcher. M is the fastening of the same to the casing. N is for the same use.

The dotted lines O, O, as shown in Fig. 3, represents the banks of the ditch which can be cut curved or crooked as well.

P, P, is where the earth falls from the slides on either side of the ditch.

Q is the standard where the self-acting hoe R, is secured as in Figs. 1 and 2, which is only used when the earth is wet, and compressed between the points of the shovels to break up and secure its fall on the inclined slides.

S, is a common colter or cutter as seen in Fig. 4, bent outward at the lower edge of the beam, and is used when the top of the ditch is desired to be wide or open and may be used on one or both sides in any known form to cut off the banks of the ditch, the earth thus cut falling to the bottom of the same under the shovels.

The nature of my invention consists in forming a simple self acting implement of revolving shovels, with a beam and casing or their equivalents, with a cutting and scraping point for ditching and the operation and use thereof will be fully understood when I say that where a ditch for drainage or other use is to be made, I first cut off with the common plow the sward or top of the ground the width of the top of the ditch as intended and then proceed by one or more teams to cut with the ditcher backward and forward in the bed of plow furrow until the cutting has reached the desired depth, removing or shoving up the plow or miner so as to have a smooth and even surface on the bottom of the ditch when completed.

What I claim as my invention and wish to secure by Letters Patent, is—

The ditching machine consisting of a beam and casing, or their equivalent, in one or more parts with a cutting and scraping point, hung on the shaft of a revolving wheel, with shovels attached to the outer circle of the wheel, which self act by turning the wheel and forming a bucket in connection with the casing so as to carry up the earth to the inclined slides, the whole being operated and constructed substantially as herein described.

RALPH C. PRATT.

Witnesses:
 GEORGE BULL,
 AARON TUTTLE.